Aug. 26, 1969   G. W. CHESTER   3,463,127
ROTARY COMBUSTION ENGINE
Filed Jan. 12, 1968   2 Sheets-Sheet 1
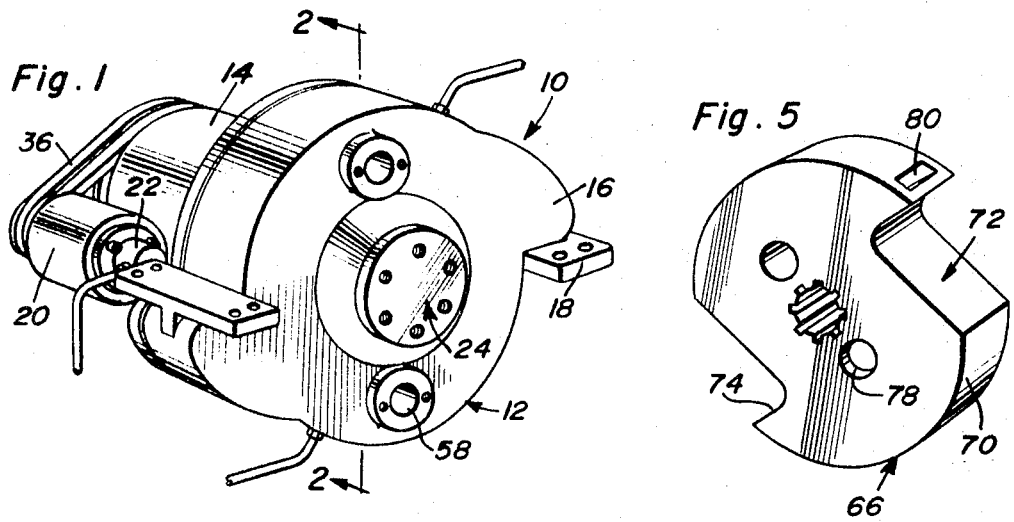
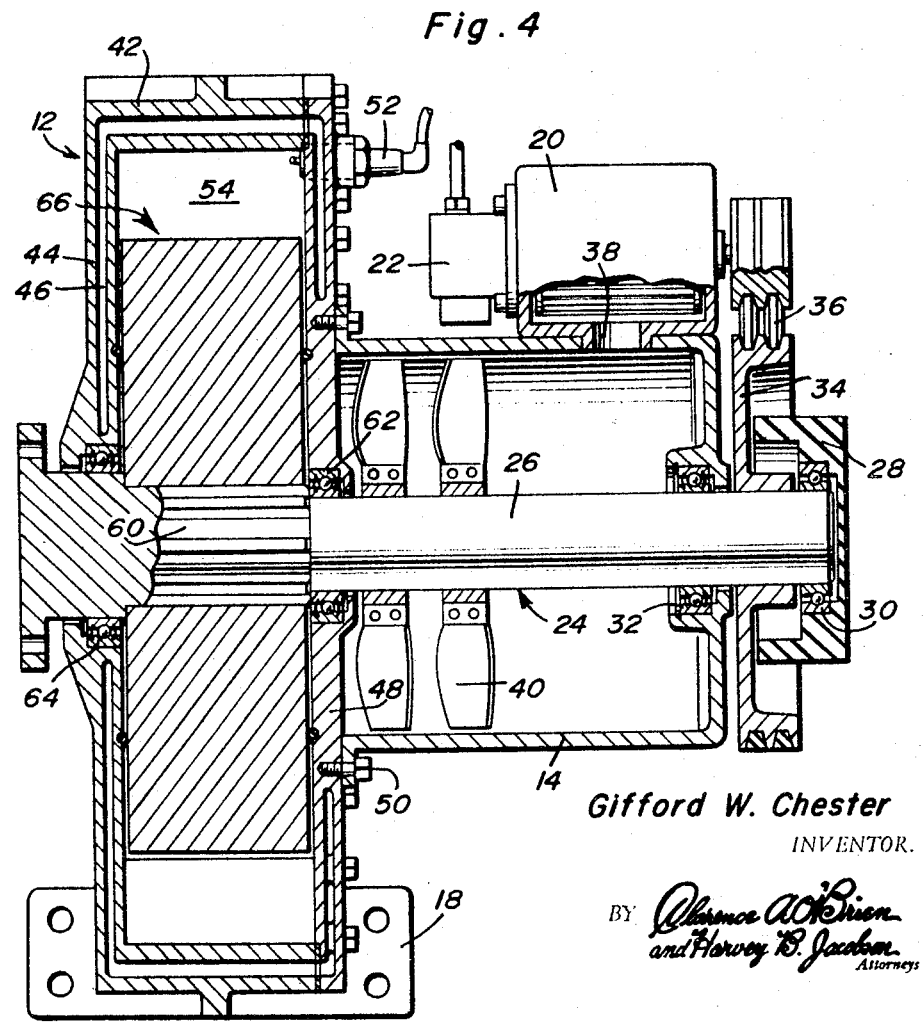
Gifford W. Chester
INVENTOR.

Aug. 26, 1969  G. W. CHESTER  3,463,127
ROTARY COMBUSTION ENGINE
Filed Jan. 12, 1968  2 Sheets-Sheet 2

Gifford W. Chester
INVENTOR.

BY Clarence A. O'Brien
and Harvey B. Jacobson
Attorneys

United States Patent Office 3,463,127
Patented Aug. 26, 1969

3,463,127
ROTARY COMBUSTION ENGINE
Gifford W. Chester, P.O. Box 3,
Bull Shoals, Ark. 72619
Filed Jan. 12, 1968, Ser. No. 697,345
Int. Cl. F02b 53/10, 55/16, 53/04
U.S. Cl. 123—8                                    9 Claims

ABSTRACT OF THE DISCLOSURE

A rotary impact engine in which peripheral pockets formed in a rotor periodically register with combustion chambers enclosed by radially projecting portions of a housing and with exhaust ports formed in the housing in axially and radially spaced relation to intake ports. A fuel mixture supplied to an engine driven blower is further compressed by flow inducing blades positioned adjacent the intake ports to transfer pressurized fuel charges, through tangentially converging passages in the rotor, to the combustion chambers.

---

This invention relates to combustion engines of the rotary impact type and more particularly a rotary type of internal combustion engine in which the fuel mixture undergoes multistage compression prior to ignition and combustion.

The present invention resides in a novel rotor construction and multistage fuel compression arrangement for an internal combustion engine. The rotor is generally cylindrical in shape provided on its periphery with circumferentially spaced pockets adapted to be periodically registered with combustion chambers enclosed by radially projecting portions of the engine housing within which the rotor is mounted. The peripheral pockets are provided with thrust absorbing faces through which rotative torque is applied to the rotor in response to combustion of fuel charges within the combustion chambers. The fuel charges are supplied to the combustion chambers through converging passages formed in the rotor that extend tangentially from intake ports toward peripheral locations leading the pockets in a forward rotational direction. Thus, the converging passages within the rotor transfer the fuel charges to the combustion chambers while the pockets transfer combustion products to the exhaust ports following each combustion phase of an operational cycle. The fuel charges supplied to the converging passages through the intake ports are pressurized by fan blades mounted on the rotor shaft within a fuel collection chamber to which a fuel mixture is supplied by an engine driven blower. An extremely efficient and smooth operating internal combustion engine is thereby provided.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a rotary combustion engine constructed in accordance with the present invention.

FIGURE 4 is another longitudinal sectional view through the engine with parts broken away and shown in section.

FIGURE 5 is a perspective view of the rotor associated with the engine of the present invention.

Figure 2:
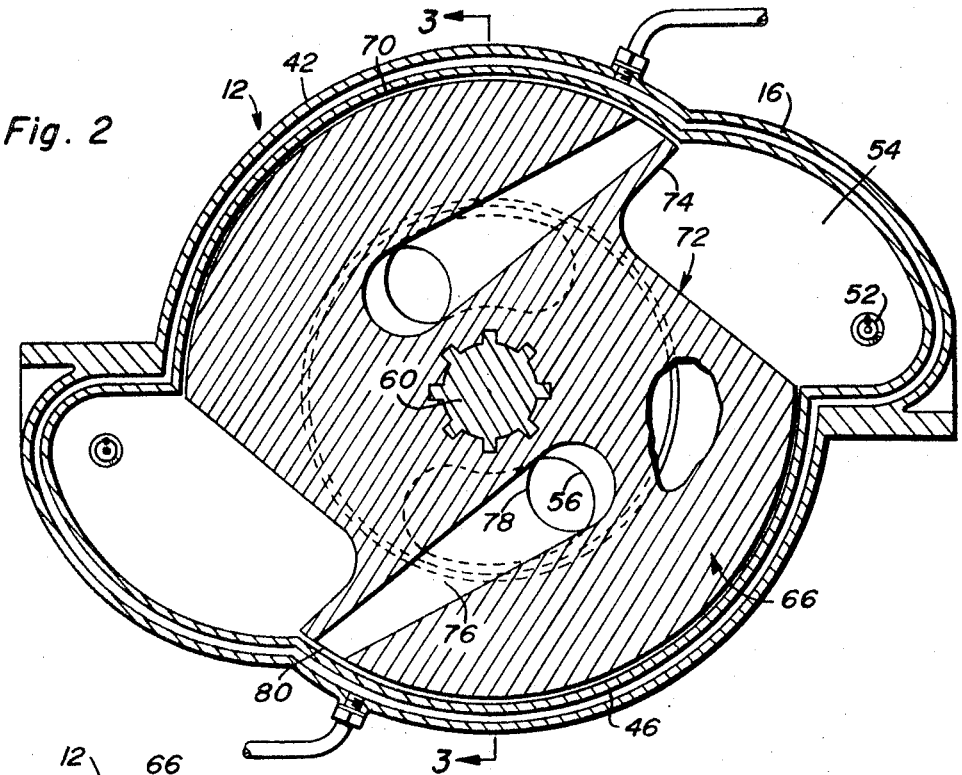
FIGURE 2 is an enlarged sectional view taken substantially through a plane indicated by section line 2—2 in FIGURE 1.

Referring now to the drawings in detail, it will be noted from FIGURE 1 that the internal combustion engine of the present invention generally referred to by reference numeral 10 includes a main housing assembly 12 which is generally cylindrical in shape in the illustrated embodiment. Secured to the main housing assembly and projecting axially therefrom, is a fuel collection chamber housing 14. The main housing assembly 12 includes two radially projecting portions 16 spaced apart substantially 180° to which mounting brackets 18 are secured. Also associated with the engine and mounted on the fuel chamber housing 14, is an engine driven blower 20 to which a suitable source of fuel is supplied through a fuel mixing carburetor 22 attached to the intake of the blower for this purpose.

Figure 3:
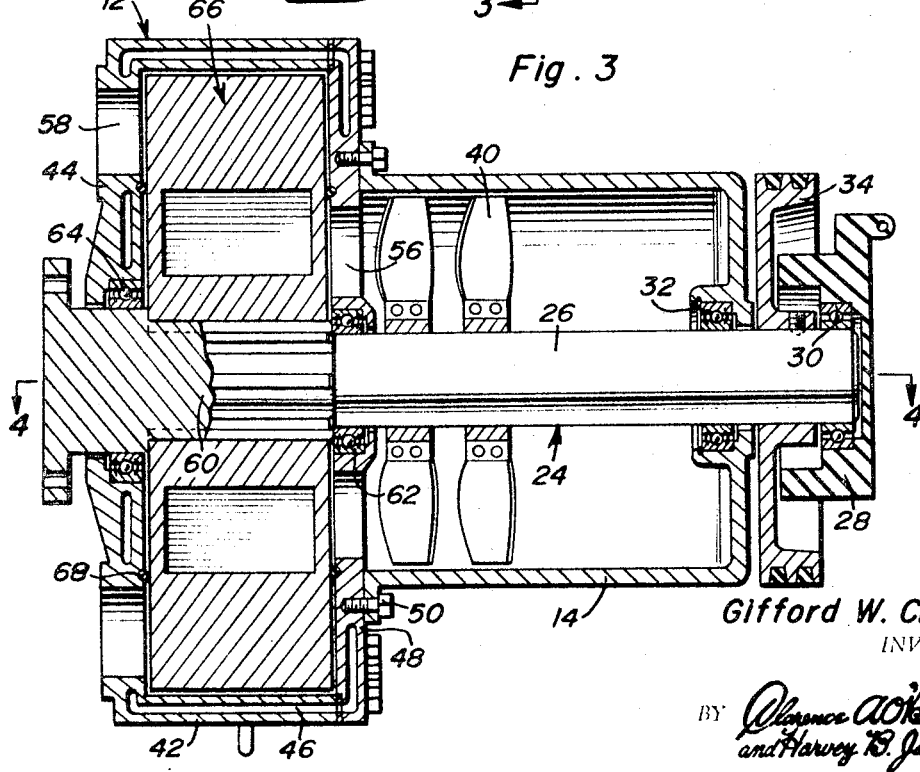
FIGURE 3 is a longitudinal sectional view through the engine taken substantially through a plane indicated by section line 3—3 in FIGURE 2.

Referring now to FIGURES 3 and 4, it will be observed that the engine includes a power shaft assembly 24 having a reduced diameter portion 26 extending through the fuel chamber 14 into a housing 28 adapted to enclose a suitable ignition controlling mechanism (not shown). The shaft portion 26 is rotatably supported by bearing assemblies 30 and 32 respectively mounted by the housing 28 and the fuel chamber housing 14 adjacent one end of the power shaft. A drive pulley 34 is secured to the shaft portion 26 between the bearings 30 and 32 so as to drive the blower device 20 through the endless belt drive mechanism 36. A fuel mixture from the carburetor 22 is thereby supplied under pressure to the fuel chamber 14 from the outlet 38 of the blower as shown in FIGURE 4.

Thus, a pressurized fuel mixture is available within the fuel chamber under a pressure which varies with the speed of the engine for introduction into the main housing assembly 12. In order to further regulate the inflow rate of the fuel mixture into the main housing assembly, a pair of fan blade assemblies 40 are mounted on the shaft portion 26 adjacent the main housing assembly. The fuel mixture therefore undergoes multistage compression before entering housing assembly 12.

The main housing assembly includes a housing section having an annular portion 42 and an end wall portion 44 through which water cooling passages 46 extend. The axial end of the housing assembly opposite the wall portion 44 is closed by an end wall 48 to which the fuel chamber housing 14 is secured by the fasteners 50. The end wall 48 also mounts spark ignition devices 52 which project into the combustion chambers 54 enclosed by the radially projecting portions 16 of the housing as more clearly seen in FIGURES 2 and 4. The end walls 48 and 44 are also respectively formed with intake ports 56 and exhaust ports 58. It will be observed that the intake ports are located at a radially inner portion of the end wall 48 while the exhaust ports 58 are located radially outwardly therefrom in the end wall 44.

As shown in FIGURES 3 and 4, the power shaft assembly 24 includes a diametrically enlarged spline portion 60 rotatably supported within the housing assembly 12 by the bearings 62 and 64 respectively mounted by the end walls 48 and 44. The spline portion 60 thus carries a generally cylindrical rotor 66 within the housing assembly. Annular seals 68 are mounted by the side walls of the housing assembly for wiping engagement with the axial sides of the rotor in order to seal the combustion chambers from the intake ports 56 and prevent escape of fluid from the intake ports between the side walls and the rotor through the radial and axial clearance passages between the rotor and the housing portion 42 as shown in FIGURES 2 and 3, through which continuous, restricted fluid communication is established between chambers 54 and exhaust ports 58. As shown in FIGURES 2 and 5, the rotor includes a peripheral surface 70 within which two thrust absorbing pockets 72 are formed, spaced apart substantially by 180°. Each pocket includes a radial thrust absorbing face 74. Thus, when the pockets are fully registered with the combustion chambers 54 as shown in FIGURE 2, combustion of the charge of fuel previously supplied to the combustion chamber will exert a rotative torque on the rotor through the face 74 in view of the shape of housing portions 16 causing the explosive forces to propel combustion gases toward an exhaust port in a direction transverse to face 74. It will also be observed, that the volume of the combustion chamber is enlarged as the pocket 72 moves into registry with the radially projecting portion 16 of the housing so as to expand the combustion chamber as it is being supplied with the fuel mixture. As the pockets move out of registry with the combustion chambers, combustion products entrapped within the pocket are transferred to an exhaust port 58. It will be appreciated, therefore, that the exhaust ports are located radially outwardly of the end wall 44 so that they may periodically communicate with the pockets 72 sequentially following alignment of the pockets with the combustion chambers as well as to be in continuous restricted fluid communication with the combustion chambers.

Before each pocket 72 is registered with a combustion chamber, a charge of fuel is supplied to the combustion chamber by means of conduits formed in the rotor 66. The conduits include a pair of converging passages 76 each having an enlarged inlet end portion 78 which opens from one axial side of the rotor for registration with an intake port 56. The passages 76 extend from the inlet ends 78 tangentially toward outlet ends 80 that open through the periphery 70 of the rotor in close spaced relation to the pockets 72. These outlet ends 70 lead the pockets in the direction of rotation so that the fuel charge may enter the combustion chamber before the pocket is registered therewith.

From the foregoing description, the construction and operation of the engine of the present invention will be apparent. In summary, it will be recalled that a fuel mixture supplied under pressure by the blower 20 to the fuel chamber 14 undergoes multi-stage compression as it is forced by the fan blade 40 into the intake ports 56 of the housing assembly 12. A charge of pressurized fuel is accordingly conducted by each passage 76, after its inlet end 78 is aligned with an intake port, to a combustion chamber 54 with which the outlet end 80 remains in communication as a pocket 72 moves into registry with the combustion chamber to expand its volume. When the outlet end 80 of the passage 76 is closed off from the combustion chamber, the fuel charge is ignited by the spark ignition device 52 resulting in combustion which exerts a rotative torque through the face 74 on the rotor to continue its rotation in one direction. Combustion products trapped within the pocket are then transferred to an exhaust port 58 as the pocket moves into registry therewith. Thus, an operational cycle is completed. Two or more of such operational cycles may occur either simultaneously or sequentially to provide a smooth and efficient delivery of power to the power shaft assembly 24 the speed of which regulates the inflow of fuel by means of the fan blades 40 and pressurization of the fuel through the blower 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An internal combustion engine comprising a housing having a radially inner intake port, a radially outer exhaust port and a combustion chamber, a power shaft rotatably mounted by the housing, a rotor fixed to the power shaft within the housing having conduit means periodically communicating with the intake port and the combustion chamber for supplying a fuel charge to the combustion chamber, annular seal means in engagement with the housing and the rotor for separating the intake port from the combustion chamber and the exhaust port, said rotor being provided with thrust absorbing means spaced from the conduit means for periodically transferring exhaust products from the combustion chamber to the exhaust port in response to rotation of the shaft, a fuel charge collection chamber mounted on the housing in fluid communication with said intake port, forced flow inducing means mounted on the shaft within said collection chamber for regulating the inflow rate of said fuel charge through the intake port and blower means driven by the power shaft for supply of fuel under pressure to the collection chamber.

2. The combination of claim 1 wherein said thrust absorbing means includes a pocket peripherally formed in the rotor volumetrically expanding said combustion chamber while being supplied with a fuel charge, said pocket having a thrust receiving face through which torque is applied to the rotor by combustion of said fuel charge in the combustion chamber.

3. The combination of claim 2 wherein said housing includes a cylindrical portion enclosing the rotor and a radially projecting portion enclosing the combustion chamber.

4. The combination of claim 3 wherein said conduit means comprises a passage formed in the rotor extending tangentially from the intake port having a peripheral outlet closely spaced in leading relation to the thrust absorbing means.

5. The combination of claim 1 wherein said housing includes a cylindrical portion enclosing the rotor and a radially projecting portion enclosing the combustion chamber.

6. The combination of claim 5 wherein said conduit means comprises a passage formed in the rotor extending tangentially from the intake port having a peripheral outlet closely spaced in leading relation to the thrust absorbing means.

7. The combination of claim 1 wherein said conduit means comprises a passage formed in the rotor extending tangentially from the intake port having a peripheral outlet closely spaced in leading relation to the thrust absorbing means.

8. The combination of claim 7 wherein said thrust absorbing means includes a pocket peripherally formed in the rotor volumetrically expanding said combustion chamber while being supplied with a fuel charge, said pocket having a thrust receiving face through which torque is applied to the rotor by combustion of said fuel charge in the combustion chamber.

9. An internal combustion engine including a housing having intake and exhaust ports and a combustion chamber, a rotor rotatably mounted within said housing, annular seal means in engagement with the housing and the rotor for preventing flow of fluid from the intake port to the exhaust port and the combustion chamber, said rotor having a pocket peripherally formed therein volumetrically expanding said combustion chamber when registered therewith, said pocket having a thrust receiving face through which torque is applied to the rotor by combustion of fuel within the combustion chamber and passage means extending tangentially through the rotor from the intake port for supplying fuel to the combustion chamber while being volumetrically expanded.

References Cited
UNITED STATES PATENTS

| | | |
|---|---|---|
| 800,684 | 10/1905 | Schneider. |
| 1,520,005 | 12/1924 | Broughton. |
| 3,298,331 | 1/1967 | Butler. |

C. J. HUSAR, Primary Examiner

U.S. Cl. X.R.

60—39.44